(12) United States Patent
Hokari (10) Patent No.: US 12,503,388 B2
(45) Date of Patent: Dec. 23, 2025

(54) DISPLAY DEVICE INCLUDING GLASS PLATE AND OPTICAL LAYER

(71) Applicant: Nippon Sheet Glass Company, Limited, Tokyo (JP)

(72) Inventor: Norihisa Hokari, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 284 days.

(21) Appl. No.: 18/012,787

(22) PCT Filed: Jun. 28, 2021

(86) PCT No.: PCT/JP2021/024430
§ 371 (c)(1),
(2) Date: Dec. 23, 2022

(87) PCT Pub. No.: WO2021/261603
PCT Pub. Date: Dec. 30, 2021

(65) Prior Publication Data
US 2023/0250014 A1  Aug. 10, 2023

(30) Foreign Application Priority Data

Jun. 26, 2020 (JP) .................. 2020-110989

(51) Int. Cl.
*C03C 17/00* (2006.01)
*C03C 21/00* (2006.01)
*G02F 1/1333* (2006.01)

(52) U.S. Cl.
CPC .......... *C03C 17/007* (2013.01); *C03C 21/002* (2013.01); *C03C 2217/465* (2013.01); *C03C 2217/478* (2013.01); *G02F 1/133331* (2021.01)

(58) Field of Classification Search
CPC ................ C03C 17/007; C03C 21/002; C03C 2217/465; C03C 2217/478; G02F 1/133331
See application file for complete search history.

(56) References Cited

U.S. PATENT DOCUMENTS

2016/0200625 A1  7/2016  Miyasaka et al.
2017/0113967 A1  4/2017  Chapman et al.
(Continued)

FOREIGN PATENT DOCUMENTS

CN    106604902 A    4/2017
CN    107117810 A    9/2017
(Continued)

OTHER PUBLICATIONS

Fuji et al. , JP2007308584A, machine translation Nov. 2007 (Year: 2007).*

(Continued)

*Primary Examiner* — Tracie Y Green
(74) *Attorney, Agent, or Firm* — Birch, Stewart, Kolasch & Birch, LLP (57) ABSTRACT

A display panel according to the present invention includes a display panel and a cover member disposed on the display panel. The cover member includes a glass plate having a first surface and a second surface, at least the first surface being chemically strengthened, and an optical layer that is layered on the second surface of the glass plate and faces the outside. In the glass plate, the depth of the compressive stress layer (dol) in the first surface is larger than that in the second surface.

17 Claims, 5 Drawing Sheets

(56) References Cited

U.S. PATENT DOCUMENTS

| | | |
|---|---|---|
| 2017/0247291 A1 | 8/2017 | Hatano et al. |
| 2017/0260079 A1 | 9/2017 | Harris et al. |
| 2018/0065881 A1 | 3/2018 | Hashimoto et al. |
| 2018/0230045 A1 | 8/2018 | Ohkawa |
| 2019/0094604 A1 | 3/2019 | Inoue et al. |
| 2019/0235304 A1* | 8/2019 | Tamada ............... G02B 5/0221 |
| 2019/0256410 A1 | 8/2019 | Isshiki et al. |
| 2020/0017400 A1* | 1/2020 | Chen ..................... C03C 21/002 |
| 2020/0055771 A1 | 2/2020 | Takeda et al. |
| 2020/0095159 A1 | 3/2020 | Marshall et al. |
| 2021/0255364 A1 | 8/2021 | Yabuta |

FOREIGN PATENT DOCUMENTS

| | | |
|---|---|---|
| CN | 110187422 A | 8/2019 |
| CN | 110264874 A | 9/2019 |
| CN | 110546118 A | 12/2019 |
| CN | 110588347 A | 12/2019 |
| JP | 2007-308584 A | 11/2007 |
| JP | 2013-116846 A | 6/2013 |
| JP | WO2015/046107 A1 | 4/2015 |
| JP | WO2017/065286 A1 | 4/2017 |
| JP | WO2017/208995 A1 | 12/2017 |
| JP | 2019-512449 A | 5/2019 |
| JP | 2019-215448 A | 12/2019 |
| WO | WO 2013/088988 A1 | 6/2013 |

OTHER PUBLICATIONS

Chinese Office Action for corresponding Chinese Application No. 202180004103.3, dated Dec. 27, 2022, with English translation.
Chinese Office Action issued in Application No. 202180004103.3, dated Apr. 19, 2022.
International Search Report (PCT/ISA/210) issued in PCT/JP2021/024430, dated Aug. 24, 2021.
Written Opinion of the International Searching Authority (PCT/ISA/237) issued in PCT/JP2021/024430, dated Aug. 24, 2021.

* cited by examiner

DISPLAY DEVICE INCLUDING GLASS PLATE AND OPTICAL LAYER

TECHNICAL FIELD

The present invention relates to a display device, a cover member included in the display device, and a method for manufacturing the cover member.

Background Art

Patent Literature 1 discloses a vehicle-mounted display device. In this display device, a cover member is fixed to the surface of a display panel, thereby protecting the display panel.

CITATION LIST

Patent Literature

Patent Literature 1: WO 2017/208995

SUMMARY OF INVENTION

Technical Problem

The cover member is provided to protect the display panel. However, there is room for further improvement of resistance against impact from the outside, and a cover member having higher impact resistance has been desired. The present invention was made in order to solve the aforementioned problem, and it is an object thereof to provide a display device capable of improving impact resistance, and a cover member included in the display device.

Solution to Problem

Item 1. A display device including:
a display panel; and
a cover member disposed on the display panel,
wherein the cover member includes:
    a glass plate having a first surface and a second surface, at least the first surface being chemically strengthened; and
    an optical layer that is layered on the second surface of the glass plate and faces the outside, and
in the glass plate, a depth of a compressive stress layer (dol) in the first surface is larger than that in the second surface.

Item 2. The display device according to item 1, wherein the glass plate is manufactured using a float process, and a concentration of tin oxide in the first surface is smaller than that in the second surface.

Item 3. The display device according to item 1 or 2, wherein the optical layer is an organic-inorganic composite film.

Item 4. The display device according to any one of items 1 to 3,
    wherein the optical layer contains at least a matrix and particles, and
    the particles form protrusions and depressions on a surface of the optical layer on a side opposite to the second surface.

Item 5. The display device according to claim 4, wherein the optical layer includes a first region in which the particles are piled up in a thickness direction of the film, and a valley-shaped second region that surrounds the first region or is surrounded by the first region.

Item 6. The display device according to claim 5, wherein the first region is a plateau-shaped region.

Item 7. The display device according to claim 5 or 6, wherein the second region includes a portion in which the particles are not piled up or the particles are not present.

Item 8. The display device according to any one of claims 5 to 7, wherein the first region has a width of 7.7 μm or more, and the second region has a width of 7 μm or more.

Item 9. The display device according to any one of claims 5 to 7, wherein the first region has a width of 10 μm or more, and the second region has a width of 10 μm or more.

Item 10. The display device according to item 4,
    wherein the particles are substantially composed of plate-shaped particles,
    each of the plate-shaped particles has a thickness within a range of 0.3 nm to 3 nm and a main surface average diameter within a range of 10 nm to 1,000 nm, and
    the main surfaces of the plate-shaped particles are oriented substantially in parallel with the second surface of the glass plate.

Item 11. The display device according to item 4, wherein the optical layer includes a region in which the particles are piled up in a thickness direction of the optical layer, and a region in which the particles are not piled up or the particles are not present.

Item 12. The display device according to item 11, wherein a difference in height measured from the second surface of the glass plate between the highest portion and the lowest portion of the optical layer is three times or more as large as the average particle diameter of the particles.

Item 13. The display device according to item 11 or 12, wherein Smr1 defined in ISO25178 is 10 to 30%.

Item 14. The display device according to any one of items 11 to 13, wherein a surface height BH20 at a load area ratio of 20% defined in ISO25178 is within a range of 0.04 μm to 0.5 μm.

Item 15. The display device according to any one of claims 11 to 14, wherein a surface height BH80 at a load area ratio of 80% defined in ISO25178 is within a range of −0.3 μm to 0 μm.

Item 16. The display device according to any one of items 1 to 15,
    wherein the surface of the optical layer has an Rsm of more than 0 μm and 35 μm or less,
    the Rsm being an average length of roughness curve elements determined in accordance with JIS B0601: 2001.

Item 17. The display device according to any one of items 1 to 16,
    wherein the surface of the optical layer has an Ra within a range of 20 nm to 120 nm,
    the Ra being an arithmetic average roughness of a roughness curve determined in accordance with JIS B0601: 2001.

Item 18. The display device according to any one of items 1 to 17,
    wherein the second surface of the glass plate has an Ra of 10 nm or less,
    the Ra being an arithmetic average roughness of a roughness curve determined in accordance with JIS B0601: 2001.

Item 19. The display device according to any one of items 1 to 18, wherein the matrix contains silicon oxide as a main component.

Item 20. The display device according to any one of items 1 to 19, wherein the glass plate has a thickness of 0.5 to 3 mm.

Item 21. A cover member to be included in a display device having a display panel, including:
 a glass plate having a first surface and a second surface, at least the first surface being chemically strengthened; and
 an optical layer that is layered on the second surface of the glass plate and faces the outside,
 wherein, in the glass plate, a depth of a compressive stress layer (dol) in the first surface is larger than that in the second surface.

Item 22. A method for manufacturing a cover member, including:
 a step of preparing a glass plate that is manufactured using a float process, and has a first surface and a second surface in which a concentration of tin oxide is smaller than that in the first surface;
 a step of layering an optical layer on the second surface of the glass plate; and
 a step of making a depth of a compressive stress layer (dol) in the first surface of the glass plate larger than that in the second surface by performing chemical strengthening,
 the cover member being to be used in such an orientation that the optical layer faces the outside.

Advantageous Effects of the Invention

With the present invention, it is possible to improve impact resistance.

DESCRIPTION OF EMBODIMENTS

Figure 1:
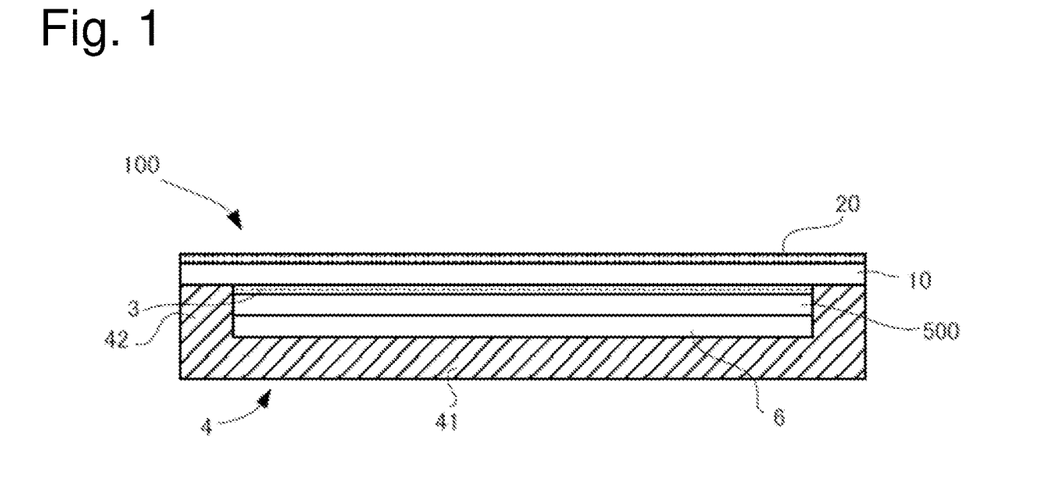
FIG. 1 is a plan view showing an embodiment of a display device according to the present invention.

Hereinafter, an embodiment in which a display device according to the present invention is applied to a vehicle-mounted display device will be described with reference to the drawings. FIG. 1 is a cross-sectional view of a display device. Examples of the vehicle-mounted display device include a car navigation system, and a display device for displaying various meters and an operation panel.

1. OVERVIEW OF DISPLAY DEVICE

As shown in FIG. 1, the display device according to this embodiment includes a housing 4 provided with an opening, a display panel 500 and a backlight unit 6 that are housed in the housing 4, and a cover member 100 that covers the opening of the housing 4. Hereinafter, the members will be described in detail.

2. HOUSING

The housing 4 includes a rectangular bottom wall portion 41, and a side wall portion 42 that rises from the peripheral edge of the side wall portion 41, and the above-described display panel 500 and backlight unit 6 are housed in the internal space surrounded by the bottom wall portion 41 and the side wall portion 42. The above-described cover member 100 is attached so as to cover the opening formed by the upper end portion of the side wall portion 42.

Although the material of the housing 4 is not particularly limited, the housing 4 can be formed using, for example, a resin material, metal, or the like.

3. DISPLAY PANEL AND BACKLIGHT UNIT

A known liquid crystal panel can be used as the display panel 500. The backlight unit 6 is configured to emit light toward the liquid crystal panel, and some backlight units formed by layering a diffusion sheet, a light-guiding plate, a light source such as an LED, a reflection sheet, and the like are known. Note that an organic EL panel, a plasma display panel, an electronic ink-type panel, and the like can be employed as the display panel 500 instead of a liquid crystal panel, for example. If the display panel 500 is constituted by a display panel other than a liquid crystal panel, there is no need to provide the backlight unit.

4. COVER MEMBER

Figure 2:
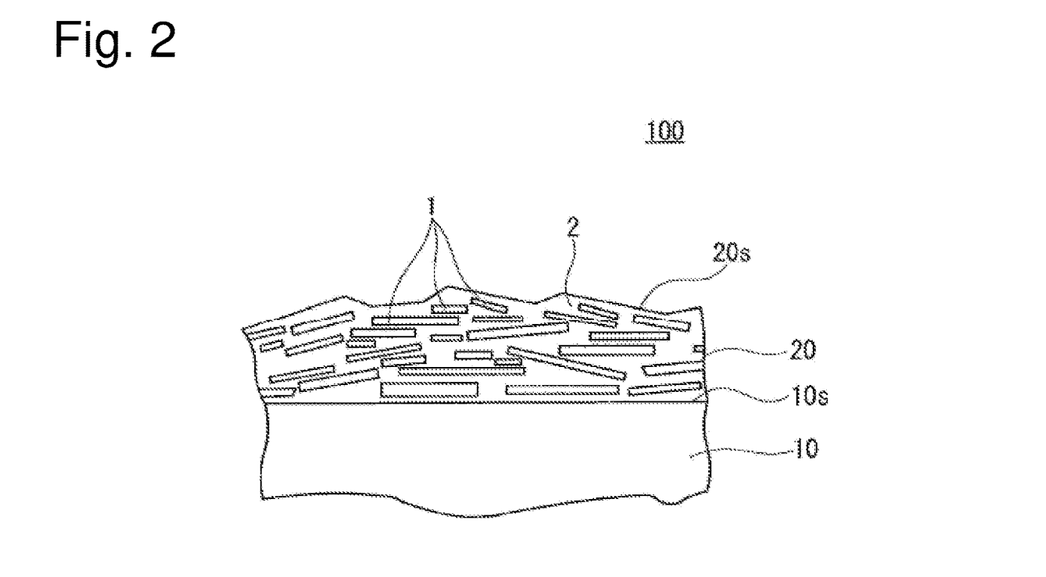
FIG. 2 is a partial cross-sectional view of a cover member included in the display device shown in FIG. 1.

The cover member 100 includes a glass plate 10 having a first surface and a second surface, an adhesive layer 3 layered on the first surface of the glass plate 10, and an optical layer 20 layered on the second surface. The cover member 100 is configured such that the first surface of the glass plate 10 faces the display panel 500 and the second surface thereof faces the outside of the display device, that is, a driver in this embodiment. A more detailed description will be given below.

4-1. Glass Plate

The glass plate 10 can be made of, for example, general-purpose soda-lime glass, borosilicate glass, aluminosilicate glass, alkali-free glass, or other types of glass. Moreover, the glass plate 10 can be formed using a float process. This production process makes it possible to obtain a glass plate 10 having a flat and smooth surface. However, the glass plate 10 may have protrusions and depressions on a main surface thereof, and may be made of, for example, figured glass. Figured glass can be formed using a production process known as a roll-out process. Figured glass that is formed using this production process usually has periodic protrusions and depressions in one direction along the main surface of the glass plate.

In the float process, molten glass is continuously supplied onto a molten metal such as molten tin, and the supplied molten glass is made to flow over the molten metal and thereby formed into a strip-like shape. The thus formed glass is called a "glass ribbon".

The glass ribbon is cooled as it moves downstream, and the cooled and solidified glass ribbon is raised from the molten metal by rollers. Then, the glass ribbon is transported to an annealing lehr by rollers, annealed, and then cut. In this manner, a float glass plate can be obtained. Here, in float glass plate, a surface that has been in contact with the molten metal is referred to as a "bottom surface", and a surface opposite to the bottom surface is referred to as a "top surface". The bottom surface and the top surface may be unpolished surfaces. Note that, since the bottom surface has been in contact with the molten metal, the concentration of tin oxide contained in the bottom surface is larger than the concentration of tin oxide contained in the top surface in the case where the molten metal is molten tin. In this embodiment, the first surface of the glass plate 10 corresponds to the top surface, and the second surface corresponds to the bottom surface.

Although the thickness of the glass plate 10 formed as mentioned above is not particularly limited, a thin glass plate is better for weight reduction. For example, the thickness thereof is preferably 0.5 to 3 mm, and more preferably 0.6 to 2.5 mm. The reason for this is that, if the glass plate 10 is excessively thin, the strength is reduced, whereas, if the glass plate 10 is excessively thick, an image on the display panel 500 may be distorted when seen through the cover member 100. The surface roughness Ra of the second surface of the glass plate 10 is preferably 10 nm or less, more preferably 5 nm or less, even more preferably 2 nm or less, and particularly preferably 1 nm or less. With this configuration, in a case where an anti-glare film is used as the optical layer as described later, anti-glare properties become prominent.

Typically, the glass plate 10 is preferably a flat plate, but may also be a curved plate. In particular, in the case where the image display surface of the display panel 500 to be combined with the glass plate 10 has a non-flat surface shape such as a curved surface, it is preferable that the glass plate 10 has a main surface with a non-flat surface shape that fits the non-flat surface shape of the image display surface. In this case, the entire glass plate 10 may be curved so as to have a certain curvature, or the glass plate 10 may be locally curved. Each of the main surfaces (the first surface and the second surface) of the glass plate 10 may be constituted by, for example, a plurality of flat surfaces being connected via curved surfaces. The radius of curvature of the glass plate 10 is, for example, 5,000 mm or less. This radius of curvature is, for example, 10 mm or more, but in particular, a locally curved portion may have an even smaller radius of curvature (e.g., 1 mm or more). The wording "main surfaces" as used herein refers to surfaces on the front and back sides other than side surfaces.

The optical layer 20 may be configured to cover the second surface of the glass plate 10 entirely or partially. In the latter case, it is sufficient that the optical layer is formed on at least a portion of the second surface that covers the image display surface of the display panel 500.

The glass plate 10 is chemically strengthened. This will be described in detail. There is no particular limitation on a chemical strengthening process. For example, a glass plate 1 can be chemically strengthened by performing an ion exchange treatment in which a glass plate that contains sodium is brought into contact with a molten salt that contains monovalent cations, preferably potassium ions, that have a larger ionic radius than sodium ions, and sodium ions in the glass plate 1 are replaced with the above-mentioned monovalent cations. A compressive stress layer in which compressive stress is applied is thus formed in the surface of the glass plate 10.

A typical example of the molten salt is that of potassium nitrate. Although a mixed molten salt of potassium nitrate and sodium nitrate may be used, a molten salt of potassium nitrate alone is preferable because it is difficult to control the concentration of the mixed molten salt.

The surface compressive stress and the depth of the compressive stress layer of the glass plate 10 can be controlled by adjusting not only the glass composition but also the temperature of the molten salt during the ion exchange treatment and the treatment time. The treatment temperature in the ion exchange treatment can be set to, for example, 360 to 460° C. Note that the treatment temperature for the glass plate 10 having a composition for the above-described chemical strengthening is preferably higher, and can be set to, for example, 400 to 460° C.

Incidentally, since the glass plate 10 of this embodiment is manufactured using the float process as described above, the concentration of tin oxide in the top surface is smaller than that in the bottom surface. Accordingly, when the above-described chemical strengthening is performed, the depth of the compressive stress layer (dol) in the top surface is larger than the depth of the compressive stress layer in the bottom surface. Depending on the conditions such as the composition of the glass plate and the temperature, the larger the depth of the compressive stress is, the smaller the surface compressive stress tends to be. Accordingly, the surface compressive stress of the bottom surface, that is, the second surface of the glass plate 10, is larger than that of the first surface. Specifically, when chemical strengthening is performed on the top surface and bottom surface of the glass plate 10 under the same conditions, the depth of the compressive stress layer in the second surface is smaller by about 1 to 10 μm than that in the first surface, and thus the surface compressive stress of the second surface is larger by about 30 to 180 MPa than the surface compressive stress of the first surface. The depth of the compressive stress layer can be measured using, for example, a surface stress meter.

For example, the inventor of the present invention obtained the following test results from chemical strengthening performed on the top surface and bottom surface of the glass plate 10 under the same conditions. That is, the depth of the compressive stress layer in the top surface was 10 to 20 μm, and the surface compressive stress was 650 to 800 MPa at this time. On the other hand, the depth of the compressive stress layer in the bottom surface was 9 to 19 μm, and the surface compressive stress was 680 to 830 MPa at this time. Therefore, when chemical strengthening is performed on both the top surface and bottom surface of the glass plate under the same conditions, the depth of the compressive stress in the bottom surface is smaller than that in the top surface, and the surface compressive stress of the bottom surface is accordingly larger than that of the top surface. Therefore, the resistance against impact applied to the glass plate is higher in the bottom surface than in the top surface.

4-2. Adhesive Layer

The adhesive layer 3 need only be capable of fixing the glass plate 10 to the display panel 500 with sufficient strength. Specifically, it is possible to use an adhesive layer constituted by a resin having tackiness at an ordinary temperature such as an acrylic resin, a rubber-based resin, or a resin having a desired glass transition temperature formed through copolymerization of a methacrylic monomer and an acrylic monomer. Examples of the acrylic monomer include methyl acrylate, ethyl acrylate, butyl acrylate, stearyl acrylate, and 2-ethylhexyl acrylate, and examples of the methacrylic monomer include ethyl methacrylate, butyl methacrylate, isobutyl methacrylate, and stearyl methacrylate. If the adhesive layer is applied through heat lamination or the like, an organic substance that softens at the lamination temperature may be used. When a resin formed through copolymerization of a methacrylic monomer and an acrylic monomer is used, the glass transition temperature thereof can be adjusted by changing the blend ratio of the monomers. The adhesive layer 71 may contain an ultraviolet absorber.

The thickness of the adhesive layer 3 can be set to, for example, 10 to 500 μm, and is preferably 20 to 350 μm. In particular, when the adhesive layer 3 has a small thickness, the distance from the display panel 500 to the outermost surface of the cover member 100 is small, and thus an image displayed on the display panel 500 can be clearly seen. On the other hand, it is not preferable that the thickness of the adhesive layer 3 is excessively small because the glass plate and the display panel 500 will be fixed to each other with reduced strength.

It is preferable that the refractive index of the adhesive layer 3 is larger than the refractive index of air and smaller than the refractive index of the glass plate 10. This makes it possible to suppress distortion of an image displayed on the display panel.

4-3. Optical Layer

Next, the optical layer will be described. Hereinafter, three types of anti-glare films will be described as examples of the optical layer. As described above, the optical layer is layered on the second surface of the glass plate 10 after chemical strengthening has been performed on the glass plate. Hereinafter, two types of anti-glare films will be described as examples of the optical layer. In the following description, the wording "substantially in parallel with" means that the angle formed between two planes of interest is 30° or less, 20° or less, or particularly 10° or less. The wording "main component" means a component that is contained in an amount of 50% or more or 80% or more in terms of mass. The wording "substantially composed of" means that a component is contained in an amount of 80% or more, 90% or more, or particularly 95% or more, in terms of mass. The wording "main surfaces" refers to surfaces on the front and back sides other than side surfaces, and more specifically to surfaces on which films are to be formed. As is the case with the above-described main surfaces of the glass plate, the "main surfaces" of a plate-shaped particle refer to a pair of surfaces on the front and back sides of the plate-shaped particle. The definition of "plateau-shaped" will be described later with reference to FIG. 8.

4-3-1. First Anti-Glare Film

First, a first anti-glare film 20 will be described with reference to FIG. 2. FIG. 2 is a partial cross-sectional view of a glass plate on which an anti-glare film is layered. Although the anti-glare film 20 is formed directly on the second surface of the glass plate 10 in the example shown in FIG. 2, another film may be provided between the glass plate 10 and the anti-glare film 20. The anti-glare film 20 includes particles 1 and a matrix 2. The anti-glare film 20 may contain voids. The voids may be contained inside the matrix 2, or may be in contact with the particles 1 and matrix 2.

4-3-1-1. Particles

Figure 3:
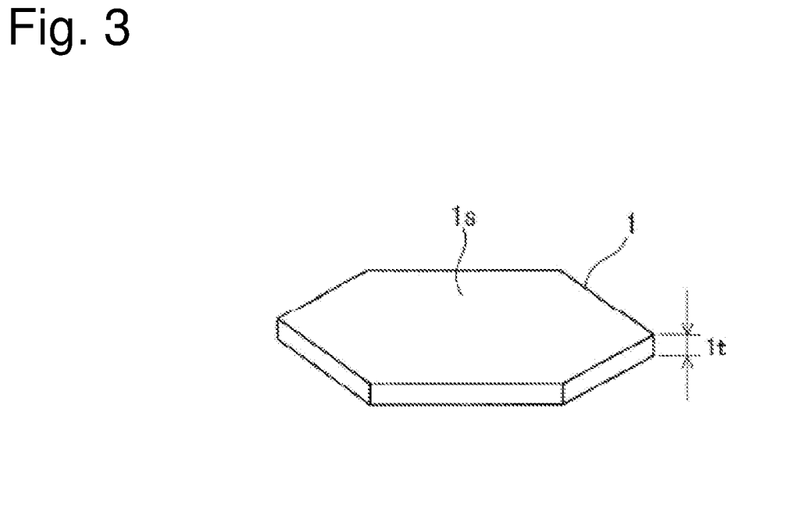
FIG. 3 is a perspective view showing an example of a particle contained in a first anti-glare film.

The particles 1 may be plate-shaped particles. The particles 1 may be substantially composed of plate-shaped particles. Note that some of the particles 1 may have a shape other than a plate shape such as a spherical shape, but the particles 1 may include no spherical particles and the like and be composed of only plate-shaped particles. FIG. 3 shows an example of the particle 1 having a plate shape. The particle 1 has a pair of main surfaces 1s. The pair of main surfaces is are substantially in parallel with each other. The main surfaces is can be substantially flat surfaces. However, steps or minute protrusions and depressions may be present on the main surfaces 1s. Note that a particle constituted by spherical silicon oxide particles that are linked together does not have a plate-shaped external shape but has a chain-shaped external shape, and thus is not considered as a plate-shaped particle.

The thickness $1t$ of the particle 1 corresponds to the distance between the pair of main surfaces is and is within a range of 0.3 nm to 3 nm. The thickness $1t$ is preferably 0.5 nm or more and more preferably 0.7 nm or more, and is also preferably 2 nm or less and more preferably 1.5 nm or less. In a case where the thickness $1t$ varies depending on location, it is sufficient that the average of the maximum thickness and the minimum thickness is taken as the thickness $1t$.

The average diameter d of the main surface is of the particle 1 is within a range of 10 nm to 1,000 nm. The average diameter d of the main surface is preferably 20 nm or more, and more preferably 30 nm or more. Also, the average diameter d is preferably 700 nm or less, and more preferably 500 nm or less. The average of the minimum value and the maximum value of the values of diameters passing through the center of gravity of the main surface is can be taken as the average diameter d of the main surface 1s.

The average aspect ratio of the particle 1 can be calculated as d/t. Although the average aspect ratio is not particularly limited, it is preferably 30 or more, and more preferably 50 or more. The average aspect ratio may also be 1000 or less, or 700 or less.

The particle 1 may be a phyllosilicate mineral particle. A phyllosilicate mineral contained in the phyllosilicate mineral particle is also called a layered silicate mineral. Examples of the phyllosilicate mineral include: kaolin minerals such as kaolinite, dickite, nacrite, and halloysite; serpentines such as chrysotile, lizardite, and amesite; dioctahedral smectites such as montmorillonite and beidellite; trioctahedral smectites such as saponite, hectorite, and sauconite; dioctahedral micas such as white mica, palagonite, illite, and celadonite; trioctahedral micas such as phlogopite, annite, and lepidolite; dioctahedral brittle micas such as margarite; trioctahedral brittle micas such as clintonite and anandite; dioctahedral chlorites such as donbassite; di-tri-octahedral chlorites such as cookeite and sudoite; trioctahedral chlorites such as clinochlore and chamosite; pyrophyllite; talc; dioctahedral vermiculite; and trioctahedral vermiculite. It is preferable that the phyllosilicate mineral particle contains a mineral belonging to smectites, kaolins, and talc. Among minerals belonging to smectites, montmorillonite is favorable. Note that montmorillonite belongs to the monoclinic system, kaolins belong to the triclinic system, and talc belongs to the monoclinic system or triclinic system.

In the anti-glare film 20, the main surfaces is of the particles 1 are oriented substantially in parallel with the second surface of the glass plate 10. The particles 1 are considered to be oriented substantially in parallel as a whole as long as 80% or more, 85% or more, or particularly 90% or more, of the particles in terms of the number of particles are oriented substantially in parallel, even if the rest of particles are not oriented substantially in parallel. When it is determined whether or not the particles 1 are arranged substantially in parallel, it is desirable to confirm the orientations of thirty, preferably fifty, plate-shaped particles.

In the case where the particle 1 is a phyllosilicate mineral particle, the (001) plane among the crystal planes of the phyllosilicate mineral may be oriented along the second surface of the glass plate 10. Such a plane orientation can be confirmed through X-ray diffraction analysis.

4-3-1-2. Matrix

It is preferable that the matrix 2 contains silicon oxide, which is an oxide of Si, as the main component. The matrix 2 containing silicon oxide as the main component is suitable for reducing the refractive index of the film and reducing the reflectivity of the film. The matrix 2 may also contain other components in addition to silicon oxide, and may also contain a component that contains silicon oxide as a portion thereof.

The component that contains silicon oxide as a portion thereof is, for example, a component that includes a portion constituted by silicon atoms and oxygen atoms and in which an atom other than a silicon atom and an oxygen atom, a functional group, or the like is linked to a silicon atom or oxygen atom in this portion. Examples of the atom other than a silicon atom and an oxygen atom include a nitrogen atom, a carbon atom, a hydrogen atom, and metallic elements listed in the next paragraph. Examples of the functional group include organic groups that are listed as R in a paragraph below. Strictly speaking, such a component is not silicon oxide because it is not composed only of a silicon atom and an oxygen atom. However, in describing the characteristics of the matrix 2, treating a silicon oxide portion that is composed of a silicon atom and an oxygen atom as a "silicon oxide" is appropriate and is also consistent with usage in the field. In this specification, the silicon oxide portion is also treated as a silicon oxide. As is clear from the above description, the atomic ratio between silicon atoms and oxygen atoms in a silicon oxide need not be stoichiometric (1:2).

The matrix 2 can contain a metal oxide other than silicon oxide, or specifically, a metal oxide component or a metal oxide portion that contains an element other than silicon. Although metal oxides that can be contained in the matrix 2 are not particularly limited, examples thereof include oxides of at least one metallic element selected from the group consisting of Ti, Zr, Ta, Nb, Nd, La, Ce, and Sn. The matrix 2 may contain an inorganic compound component other than an oxide, examples of which include a nitride, a carbide, and a halide, or may contain an organic compound component.

A metal oxide such as silicon oxide can be formed from a hydrolyzable organic metal compound. An example of a hydrolyzable silicon compound is a compound represented by Formula (1).

$$R_n SiY_{4-n} \tag{1}$$

R is an organic group including at least one selected from an alkyl group, a vinyl group, an epoxy group, a styryl group, a methacryloyl group, and an acryloyl group. Y is a hydrolyzable organic group that is at least one selected from an alkoxy group, an acetoxy group, an alkenyloxy group, and an amino group, or a halogen atom. The halogen atom is preferably Cl. n is an integer from 0 to 3 and is preferably 0 or 1.

R is preferably an alkyl group. For example, an alkyl group having 1 to 3 carbon atoms is preferable, and a methyl group is particularly preferable. Y is preferably an alkoxy group. For example, an alkoxy group having 1 to 4 carbon atoms is preferable, and a methoxy group and an ethoxy group are particularly preferable. Two or more compounds represented by the formula above may also be used in combination. As an example of this combination, a tetraalkoxysilane, where n is 0, and a monoalkyltrialkoxysilane, where n is 1, may be used together.

After hydrolysis and polycondensation, the compound represented by Formula (1) forms a network structure in which silicon atoms are linked to one another via oxygen atoms. In this structure, the organic groups represented by R are contained in a state of being directly linked to silicon atoms.

4-3-1-3. Physical Properties of First Anti-Glare Film

The ratio of the particles 1 to the matrix 2 in the anti-glare film 20 in terms of mass is, for example, 0.05 to 10, 0.05 to 7, or preferably 0.05 to 5. Although the volume ratio of the voids in the anti-glare film 20 is not particularly limited, it may be 10% or more, or 10 to 20%. However, the voids need not necessarily be present.

Although the thickness of the anti-glare film 20 is not particularly limited, it is suitable that the anti-glare film 20 has a thickness of, for example, 50 nm to 1,000 nm, 100 nm to 700 nm, or particularly 100 nm to 500 nm, from the viewpoint that the anti-glare properties are likely to be appropriately obtained, for example. It is preferable that the anti-glare film 20 has a thickness that is smaller than or equal to the above-described upper limit in order to orient the main surfaces of the plate-shaped particles substantially in parallel with a substrate. In the case of a thick film, there is a strong tendency for plate-shaped particles to be oriented in a random manner.

It is preferable that minute protrusions and depressions are present on a surface 20s of the anti-glare film 20. The anti-glare properties can be expected to be increased due to the minute protrusions and depressions. However, the development of the protrusions and depressions on the surface 20s is suppressed due to the particles 1 being oriented along the second surface of the glass plate 10. The surface roughness of the surface 20s of the anti-glare film 20, which is determined as Ra, is 20 nm to 120 nm, 30 nm to 110 nm, or preferably 40 nm to 100 nm. Ra is the arithmetic average roughness of a roughness curve determined in accordance with JIS B0601: 2001. For example, if particles are oriented in a random manner, the surface roughness Ra will be larger than the above-described range.

The surface 20s has an Rsm of more than 0 µm and 35 µm or less, 1 µm to 30 µm, or preferably 2 µm to 20 µm. Rsm is the average length of roughness curve elements determined in accordance with JIS B0601: 2001. If Rsm is not excessively large, the appearance of what is known as sparkles can be favorably suppressed.

Sparkles are bright spots that appear depending on the relationship between the minute protrusions and depressions for imparting the anti-glare properties and the pixel size of the display panel. The sparkles are observed as light that irregularly flickers with a change in the relative positions between a display device and the user's eyes. The sparkles have become apparent with an increase in resolution of display devices. The anti-glare film 20 having an Ra and an Rsm that are within the above-described ranges is particularly suitable for reducing gloss and haze with good balance while suppressing the appearance of sparkles.

4-3-1-4. Optical Properties of Cover Member

The gloss can be evaluated based on the specular gloss. The 60° specular gloss of the glass plate 10 is, for example, 60 to 130%, 70 to 120%, or particularly 80 to 110% or 85 to 100%. These specular gloss values are measured on the surface 10s on which the anti-glare film 20 is formed. The haze ratio of the glass plate 10 is, for example, 20% or less, 15% or less, or particularly 10% or less, or may be 1 to 8%, 1 to 6%, or particularly 1 to 5%, in certain cases.

The 60° specular gloss G and the haze ratio H (%) preferably satisfy Relational Expression (a), more preferably Relational Expression (b), and even more preferably Relational Expression (c). G and H may satisfy Relational Expression (d).

$$H \leq -0.2G+25 \quad \text{(a)}$$

$$H \leq -0.2G+24.5 \quad \text{(b)}$$

$$H \leq -0.2G+24 \quad \text{(c)}$$

$$H \leq -0.15G+18 \quad \text{(d)}$$

Note that the gloss can be measured in conformity with "Method 3 (Specular gloss at 60 degrees)" of "Specular glossiness—Methods of measurement" in JIS Z8741-1997, and the haze can be measured in conformity with JIS K7136: 2000.

4-3-2. Second Anti-Glare Film

Figure 4:
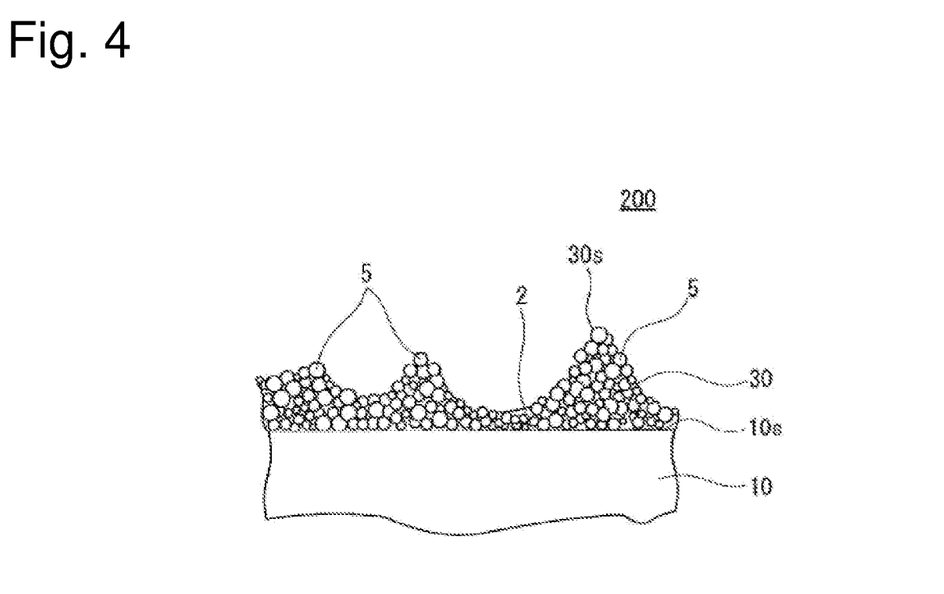
FIG. 4 is a cross-sectional view of a cover member in which a second anti-glare film is layered.
Figure 5:
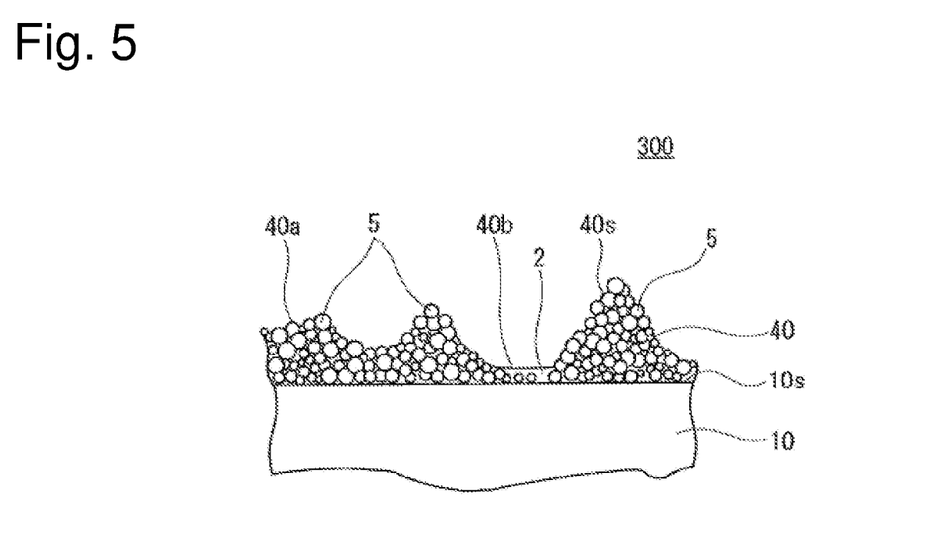
FIG. 5 is a cross-sectional view of a cover member in which a second anti-glare film is layered.

Next, a second anti-glare film will be described with reference to FIGS. 4 and 5. FIGS. 4 and 5 are partial cross-sectional views of a glass plate on which a second anti-glare film is layered. Although anti-glare films 30 and 40 are each formed directly on the second surface of the glass plate 10 in FIGS. 4 and 5, other films may be provided between the glass plate 10 and the anti-glare film and the glass plate 10 and the anti-glare film 40. The anti-glare films 30 and 40 include particles 5 and the matrix 2. The anti-glare films 30 and 40 may contain voids. The voids may be contained inside the matrix 2, or may be in contact with the particles 5 and matrix 2.

In the anti-glare film 30, the particles 5 are piled up in the thickness direction of the film in all the regions, whereas the anti-glare film 40 includes a region 40a in which the particles 5 are piled up in the thickness direction of the film and a region 40b in which the particles 5 are not piled up in that direction or the particles 5 are not present. The region 40b may be a region having a surface 40s that is substantially in parallel with the second surface of the glass plate 10 and from which the particles 5 are not exposed, instead of a region in which the particles 5 are not piled up in that direction or the particles 5 are not present. The region 40b may spread over, for example, 0.25 µm² or more, 0.5 µm² or more, or particularly 1 µm² or more. Note that, in at least some of the regions 40a of the anti-glare films 30 and 40, the particles 5 are piled up to a height that is 5 times or more, or 7 times or more, as high as the average particle diameter of the particles 5.

4-3-2-1. Particles

Although the shape of the particle 5 is not particularly limited, a spherical shape is preferable. The particles 5 may be substantially composed of spherical particles. However, some of the particles 5 may have a shape other than a spherical shape such as a plate shape. The particles 5 may be composed of only spherical particles. Here, the spherical particles are particles in which a ratio of the longest diameter passing through the center of gravity to the shortest diameter passing through the center of gravity is 1 or more and 1.8 or less, or particularly 1 or more and 1.5 or less, and its surface is constituted by a curved surface. The average particle diameter of the spherical particles may be 5 nm to 200 nm, nm to 100 nm, or particularly 20 nm to 60 nm. The average particle diameter of the spherical particles is determined as an average of the diameters of the particles (specifically, the diameter of the particle is an average value of the above-described shortest diameter and longest diameter), and it is desirable that the average particle diameter is determined using thirty, preferably fifty, particles based on an SEM image.

Preferable ranges of the thickness t, main surface average diameter d, and aspect ratio d/t of a plate-shaped particle that may be included as a portion of the particles are the same as those in the case of the first anti-glare film.

Although a material for forming the particles 5 is not particularly limited, it is preferable that the material contains a metal oxide, particularly silicon oxide. However, the metal oxide may include an oxide of at least one metallic element selected from the group consisting of Ti, Zr, Ta, Nb, Nd, La, Ce, and Sn, for example.

The particles 5 can be supplied to the anti-glare films 30 and 40 from a dispersion liquid of particles 5. In this case, it is preferable to use a dispersion liquid in which the particles 5 are dispersed in a state of being separate from one another. Use of a dispersion liquid in which the particles do not aggregate rather than a dispersion liquid in which the particles are linked together in a chain shape is suitable for achieving desirable aggregation of the particles in the anti-glare films 30 and 40. The reason for this is that the particles that are separate from one another are likely to move along with volatilization of a liquid such as a dispersion medium and are likely to form, in the film, an aggregate that is suitable for achieving favorable properties.

4-3-2-2. Matrix

The matrix 2 is the same as that of the above-described first anti-glare film 20. However, it is preferable that the matrix 2 of the second anti-glare films 30 and 40 contains a nitrogen atom. It is preferable that a nitrogen atom is contained as a portion of an organic compound component or a functional group, particularly a nitrogen-atom-containing functional group. The nitrogen-atom-containing functional group is preferably an amino group. A nitrogen atom can make up a portion of a highly reactive functional group particularly in a raw material for forming a matrix that contains a metal oxide such as silicon oxide as a main component. Such a functional group can promote aggregation of the particles 5 during film formation and play a role in achieving a desirable form of the aggregate of the particles 5.

A metal oxide such as silicon oxide can be formed from a hydrolyzable organic metal compound. An example of a hydrolyzable silicon compound is a compound represented by Formula (1).

A nitrogen atom can also be supplied to the anti-glare films 30 and 40 from a silicon-atom-containing compound, specifically an amino-group-containing silane coupling agent. This compound can be represented by, for example, Formula (2).

$$A_kB_mSiY_{4-k-m} \qquad (2)$$

A is an organic group containing an amino group. The amino group may be a primary, secondary, or tertiary amino group. A is an amino-group-containing hydrocarbon, for example, preferably an alkyl group or alkenyl group in which some atoms are substituted with an amino group, more preferably an alkyl group or alkenyl group in which a hydrogen atom is substituted with an amino group, and particularly preferably an alkyl group or alkenyl group having an amino group at its terminus. The alkyl group and the alkenyl group may be linear or branched. Preferable specific examples of A include ω-aminoalkyl groups having an amino group at the terminus of an alkyl group, and N-ω'-(aminoalkyl)-ω-aminoalkyl groups obtained by substituting a hydrogen atom of the amino group of the ω-aminoalkyl group with another aminoalkyl group. It is preferable that A contains a carbon atom as an atom to be linked to the silicon atom. In this case, a hydrocarbon group typified by alkyl groups and alkenyl groups can be provided between the nitrogen atom and the silicon atom. In other words, the nitrogen atom may be linked to the silicon atom contained in silicon oxide via a hydrocarbon group. A is particularly preferably a γ-aminopropyl group or an N-(2-aminoethyl)-3-aminopropyl group.

B may be one of the organic groups listed above as R, or an alkyl group or alkenyl group. The alkyl group or alkenyl group may be branched, and some of hydrogen atoms thereof may be substituted. B is preferably a non-substituted alkyl group, more preferably a linear alkyl group whose carbon chain has 1 to 3 carbon atoms, and even more preferably a methyl group. Y is as described above. k is an integer from 1 to 3, m is an integer from 0 to 2, and k+m is an integer from 1 to 3. k is 1, and m is 0 or 1. Note that, when A is a γ-aminopropyl group, it is preferable that k is 1 and m is 0, and when A is N-(2-aminoethyl)-3-aminopropyl group, it is preferable that k is 1 and m is 0 or 1.

After hydrolysis and polycondensation, the compound represented by Formula (2) forms a network structure in which silicon atoms are linked to one another via oxygen atoms. When used together with the compound represented by Formula (1), the compound represented by Formula (2) makes up a portion of the network structure. In this structure, the organic groups represented by A are contained in a state of being directly linked to silicon atoms.

It is considered that the organic group represented by A attracts particles and promotes aggregation of the particles during volatilization of a solvent of a coating solution.

The first and second anti-glare films 20, 30, and 40 having the above-described compositions can be said to be organic-inorganic composite films.

4-3-2-3. Physical Properties of Second Anti-Glare Film

Although the ratios of the particles 5 to the matrix 2 in the anti-glare films 30 and 40, the film thicknesses of the anti-glare films 30 and 40, the Ra of the surfaces 30s and 40s, and the Rsm of the surfaces 30s and 40s are not particularly limited, the ranges therefor may be the same as those in the case of the above-described first anti-glare film 20.

In the anti-glare films 30 and 40, the particles 5 locally aggregate and lie on top of one another, and thus this portion of the film has an increased thickness, whereas the particles 5 do not lie on top of one another in another portion, and thus the thickness of the film is locally reduced. In the anti-glare films 30 and 40, a difference in height measured from the second surface of the glass plate 10 between the highest portion and the lowest portion may be three times or more, or four times or more, as large as the average particle diameter of the particles 5.

In the region 40b of the anti-glare film 40, the particles are not piled up in the thickness direction of the film, or the particles are not present. In the latter case, the region 40b of the film 40 may be composed of only the matrix 2. The area ratio of the region 40b to the region on which the anti-glare film 40 is formed may be, for example, 5 to 90%, 10 to 70%, or particularly 20 to 50%.

4-3-2-4. Optical Properties of Cover Member

The gloss can be evaluated based on the specular gloss. The 60° specular gloss of the glass plate 10 is, for example, 60 to 130%, 70 to 120%, or particularly 80 to 110% or 85 to 100%. These specular gloss values are measured on the second surfaces of the glass plates on which the anti-glare films 30 and 40 are formed. The haze ratio of the glass plate 10 is, for example, 20% or less, 15% or less, or particularly 10% or less, or may be 1 to 8%, 1 to 6%, or particularly 1 to 5%, in certain cases.

The 60° specular gloss G and the haze ratio H (%) preferably satisfy Relational Expression (a), and more preferably Relational Expression (b).

$$H \leq -0.2G+25 \qquad (a)$$

$$H \leq -0.2G+24.5 \qquad (b)$$

The numbers of Japanese Industrial Standards that are referred to for measurement of the gloss and haze are as described above.

4-3-2-5. Load Curve Parameters

Cover glass 200 and 300 in which the second anti-glare film is layered can have the following characteristics regarding load curve parameters in conformity with ISO25178. Note that, as specified in ISO25178, in a load curve, the frequencies at certain heights are accumulated from a higher side and are expressed in percentage with the total number of pieces of data at all the heights being taken as 100. Based on the load curve, a load area ratio at a certain height C is given as Smr(C). A line having the smallest slope among lines on which a difference between the Smr values at any two heights is 40% is defined as an equivalent line. At this time, a difference in height between a point on the equivalent line at a load area ratio of 0% and a point on the equivalent line at a load area ratio of 100% is defined as a level difference Sk in a core portion. A load area ratio at which a peak above the core portion is divided from the core portion is defined as Smr1, and a load area ratio at which a valley below the core portion is conversely divided from the core portion is defined as Smr2. Surface heights at load area ratios of 20, 40, 60, and 80% are respectively defined as BH20, BH40, BH60, and BH80.

Smr1 may be 1 to 40% or 3 to 35%, or 10 to 30% in certain cases. BH20 is, for example, 0.04 μm to 0.5 μm, 0.06 μm to 0.5 μm, or preferably 0.12 μm to 0.3 μm. BH80 is, for example, −0.3 μm to 0 μm, −0.3 μm to −0.05 μm, or preferably −0.25 μm to −0.12 μm.

4-3-3. Third Anti-Glare Film

Figure 6:
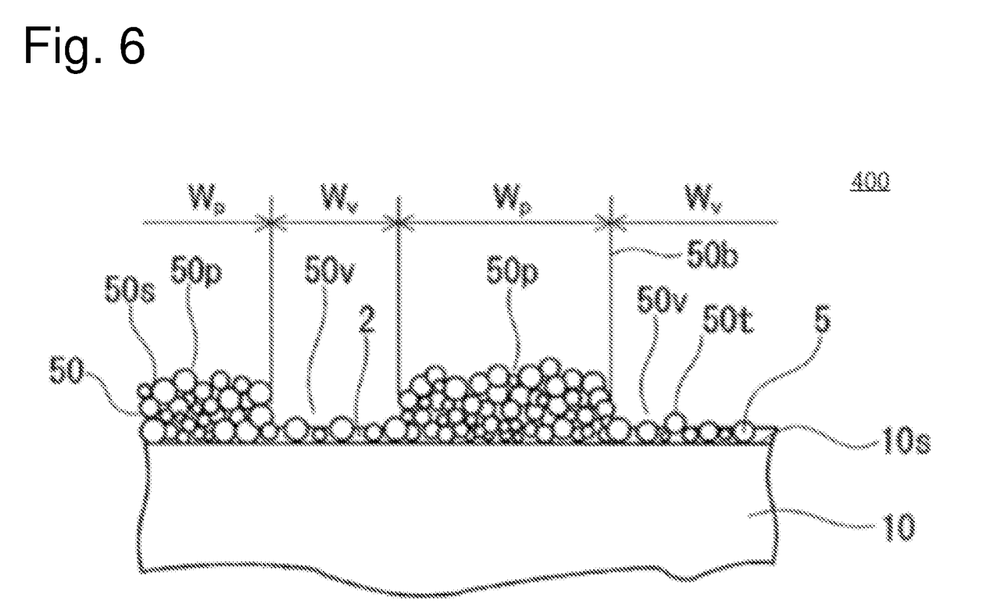
FIG. 6 is a cross-sectional view of a cover member in which a third anti-glare film is layered.
Figure 7:
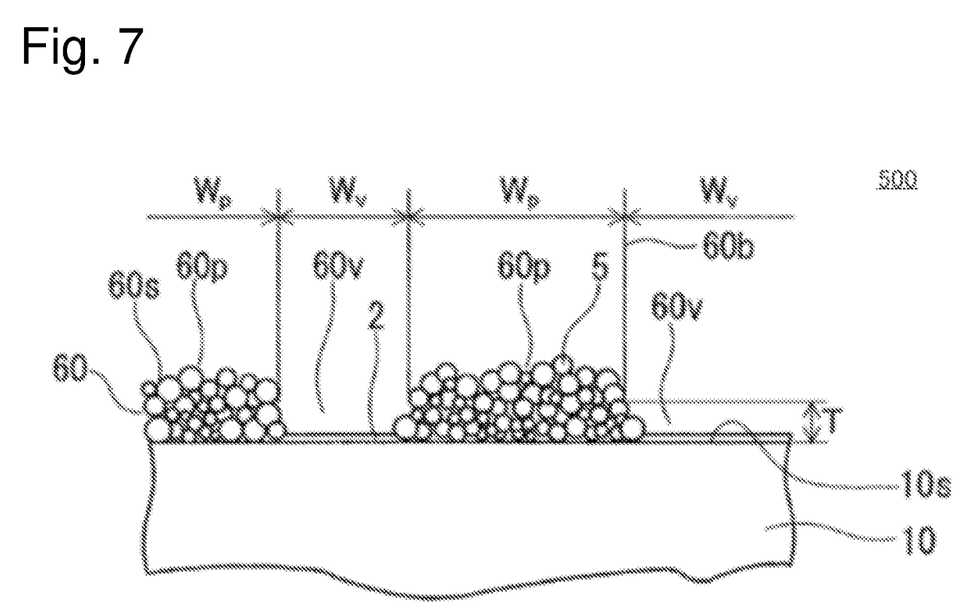
FIG. 7 is a cross-sectional view of a cover member in which a third anti-glare film is layered.

Next, a third anti-glare film will be described with reference to FIGS. 6 and 7. FIG. 6 is a partial cross-sectional view of a glass plate on which a third anti-glare film is layered, and FIG. 7 is a partial cross-sectional view showing another example of a glass plate on which a third anti-glare film is layered. As shown in FIGS. 6 and 7, cover members 400 and 500 each include a glass plate 10. The cover members 400 and 500 also include anti-glare films 50 and 60 provided on the glass plate 10, respectively.

Although the anti-glare films 50 and 60 are each formed directly on the main surface 10s of the glass plate 10 in FIGS. 6 and 7, other films may be provided between the glass plate 10 and the anti-glare film 50 and the glass plate 10 and the anti-glare film 60. The anti-glare films 50 and 60 include the particles 5 and the matrix 2. The anti-glare films 50 and 60 may contain voids. The voids may be contained inside the matrix 2, or may be in contact with the particles 5 and matrix 2.

The anti-glare films 50 and 60 include first regions 50p and 60p, respectively, and also include second regions 50v and 60v, respectively. In the first regions 50p and 60p, the particles 5 are piled up in the thickness direction of the anti-glare films 50 and 60. When the anti-glare films 50 and 60 are observed from the front side thereof in the thickness direction, the second regions 50v and 60v respectively surround the first regions 50p and 60p. However, the second regions 50v and 60v may be respectively surrounded by the first regions 50p and 60p. The first regions 50p and 60p and the second regions 50v and 60v are arranged such that, for example, one of the first region and the second region is provided between a plurality of the other regions that are separated from each other. This structure may also be referred to as a sea-island structure. The second regions 50v and 60v are valley-shaped regions whose surfaces are recessed relative to the surrounding first regions. Accordingly, the island portions in the sea-island structure protrude from the sea portions when the first regions 50p and 60p correspond to the island portions, whereas the island portions are recessed from the sea portions when the second regions 50v and 60v correspond to the island portions. Fewer particles are piled up in the second regions 50v and 60v compared with the first regions 50p and 60p. The second regions 50v and 60v may include a portion 50t in which the particles 5 are piled up (see FIG. 6). The second regions 50v and 60v may include a portion in which the particles 5 are not piled up or the particles 5 are not present (see FIGS. 6 and 7). At least some of the second regions 50v and 60v may be composed of a portion in which the particles 5 are not piled up or the particles 5 are not present. In the case of the first regions 50p and 60p, at least some of them or 50% or more thereof in terms of the number of regions, or all of them may be composed of a plateau-shaped region.

Figure 8:
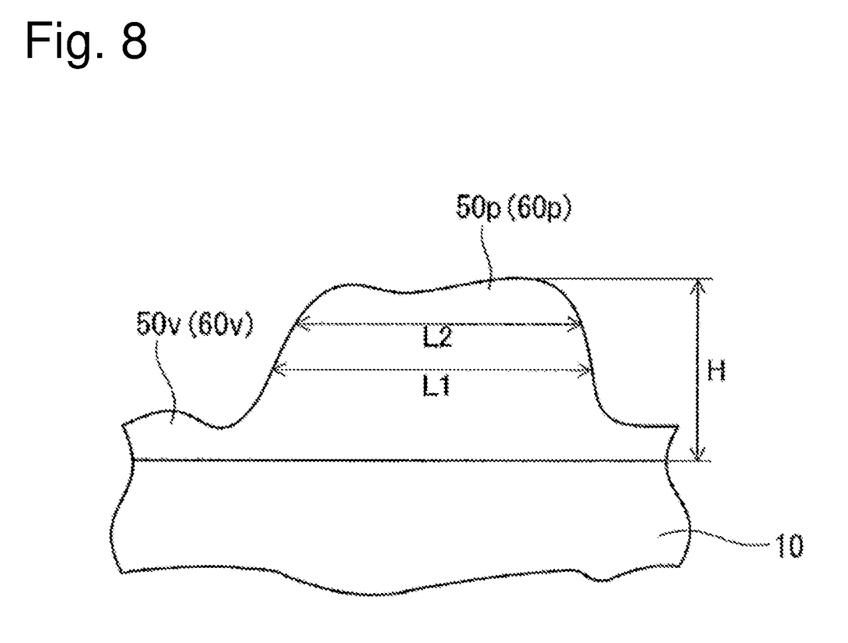
FIG. 8 is a schematic cross-sectional view showing a cross section of a protrusion in a film of the cover member in which a third anti-glare film is layered.

The term "plateau-shaped" means that, when the film is observed under an SEM, the upper portion of a protrusion on the anti-glare films 50 and 60 seems to have a plateau shape. Strictly speaking, this term means that a relationship L2/L≥10.75, particularly L2/L≥10.8, is satisfied in the cross section of the film. Here, as shown in FIG. 8, L1 is a length of a portion located at a height corresponding to 50% of the height H of a protrusion, and L2 is a length of a portion located at a height corresponding to 70%, preferably 75%, of the height H of the protrusion. As shown in FIG. 8, L2 may be divided into two or more portions with respect to one L1. In this case, the total length of the two or more portions is taken as L2.

Boundaries 50b and 60b between the first regions 50p and 60p and the second regions 50v and 60v can be determined based on average thicknesses T of the anti-glare films 50 and 60 (see FIG. 7). The average thickness T can be measured using a laser microscope as described later. Based on the intervals between the boundaries 50b and the intervals between the boundaries 60b, widths Wp of the first regions 50p and 60p and widths Wv of the second regions 50v and 60v are determined.

The width Wp may be 5 μm or more, 7.7 μm or more, or preferably 10 μm or more. The width Wv may be 3.5 μm or more, 7 μm or more, or preferably 10 μm or more. When the width Wp is large, the haze ratio tends to decrease because the anti-glare film is likely to directly transmit visible light incident thereon. When the width Wv is large, gloss tends to decrease because the anti-glare film moderately scatters visible light incident thereon. A film having a width Wp of 10 μm or more and a width Wv of 10 μm or more is particularly suitable for achieving both low haze ratio and low gloss.

The first regions 50p and 60p and the second regions 50v and 60v each may spread over an area of, for example, 0.25 μm$^2$ or more, 0.5 μm$^2$ or more, or particularly 1 μm$^2$ or more, or 5 μm$^2$ or more or 10 μm$^2$ or more in certain cases.

The anti-glare films 50 and 60 include first regions 50p and 60p, respectively, and also include second regions 50v and 60v, respectively. The area ratio of the second regions 50v and 60v to the region on which the anti-glare film 40 is formed may be, for example, 5 to 90%, 10 to 70%, or particularly 20 to 50%. The anti-glare films 50 and 60 may be composed of only the first regions 50p and 60p and the second regions 50v and 60v.

4-3-3-1. Particles

The particles 5 are the same as those in the description of the second anti-glare film.

4-3-3-2. Matrix

The matrix 2 is the same as those in the descriptions of the first and second anti-glare films. However, unlike the second anti-glare film, it is less necessary to add a nitrogen atom to promote aggregation of the particles 5 in the third anti-glare film. Accordingly, it is preferable to form a metal oxide such as silicon oxide used to form the matrix 2 from a hydrolyzable organic metal compound, particularly a compound represented by Formula (1). The matrix 2 may be substantially composed of silicon oxide.

4-3-3-3. Physical Properties of Third Anti-Glare Film

Although, in the anti-glare films 50 and 60, the ratios of the particles 5 to the matrix 2, the film thicknesses, the Ra of the surfaces 50s and 60s, and the Rsm of the surfaces 50s and 60s are not particularly limited, the ranges therefor may be the same as those in the descriptions of the first and second anti-glare films. In the anti-glare films 50 and 60, a difference in height measured from the main surface 10s of the glass plate 10 between the highest portion and the lowest portion may be three times or more, or four times or more, as large as the average particle diameter of the particles 5.

4-3-3-4. Optical Properties of Cover Member

The gloss can be evaluated based on the specular gloss. The 60° specular gloss of the glass plate 10 is, for example, 60 to 130%, 70 to 120%, or particularly 80 to 110% or 85 to 100%. These specular gloss values are measured on the surfaces 10s on which the anti-glare films 50 and 60 are formed. The haze ratio of the glass plate 10 is, for example, 20% or less, 15% or less, or particularly 10% or less, or may be 1 to 8%, 1 to 6%, or particularly 1 to 5%, in certain cases.

The 60° specular gloss G and the haze ratio H (%) preferably satisfy Relational Expression (a), more preferably Relational Expression (b), and even more preferably Relational Expression (c). G and H may satisfy Relational Expression (d).

$$H \leq -0.2G+25 \quad (a)$$

$$H \leq -0.2G+24.5 \quad (b)$$

$$H \leq -0.2G+24 \quad (c)$$

$$H \leq -0.15G+18 \quad (d)$$

The numbers of Japanese Industrial Standards that are referred to for measurement of the gloss and haze are as described above.

4-4. Method for Forming Optical Layer

Although a method for forming an optical layer is not particularly limited, the optical layer can be formed as follows, for example. First, a material (e.g., tetraethoxysilane) for forming the above-described matrix is dissolved under an acidic condition to form a solution, and thus a matrix precursor solution is produced. Also, a dispersion liquid containing the above-described particles (e.g., smectite dispersion liquid) is diluted with ethanol or the like to produce a fine-particle dispersion liquid. Then, the matrix precursor solution and the fine-particle dispersion liquid are mixed to produce a coating solution for an optical layer.

Next, the coating solution is applied to the second surface of the glass plate 10 that has been washed. Although the application method is not particularly limited, flow coating, spray coating, spin coating, or the like can be used, for example. After that, the glass plate to which the coating solution has been applied is dried at a predetermined temperature (e.g., 80 to 120° C.) in an oven or the like in order to, for example, volatilize the alcohol from the solution, and then sintered at a predetermined temperature (e.g., 400 to 650° C.) for the purpose of hydrolysis and organic chain decomposition, for example. Thus, an optical layer can be obtained.

5. FEATURES

The display device according to this embodiment can exhibit the following effects. That is, the anti-glare films 20, 30, 40, 50, and 60 are layered as an optical layer in the cover members 100, 200, 300, 400, and 500, and this enables an image displayed on the display panel 500 to be clearly seen. The glass plate 10 and the display panel 500 are directly fixed to each other using the adhesive layer 3 with no air layer being located therebetween, and this also enables an image displayed on the display panel 500 to be clearly seen.

Furthermore, in this display device, the glass plate is chemically strengthened, and the depth of the compressive stress in the second surface, which faces the outside (a driver), is smaller than that in the first surface. Accordingly, the surface compressive stress of the second surface is larger than that of the first surface, thus making it possible to improve the resistance against impact applied from the outside. Moreover, the glass plate 10 is manufactured using a float process, and the bottom surface in which the concentration of tin oxide is larger corresponds to the second surface and faces the outside. Therefore, when chemical strengthening is performed, the depth of the compressive stress layer in the second surface can be made smaller than that in the first surface.

6. MODIFIED EXAMPLES

Although an embodiment of the present invention has been described above, the present invention is not limited to the embodiment above, and various modifications can be carried out without departing from the gist of the invention. Note that the following modified examples can be combined as appropriate.

6-1

The configuration of the housing 4 is not particularly limited, and it is sufficient that the display panel 500 and the backlight unit 6 can be housed therein. An organic EL panel, a plasma display panel, an electronic ink-type panel, and the like, for example, can also be used as the display panel 500 instead of employing the above-described liquid crystal panel. If the display panel 500 is constituted by a display panel other than a liquid crystal panel, there is no need to use the backlight unit 6. Instead of the adhesive layer 3, air may be provided between the display panel 500 and the cover member 100.

6-2

Although the cover member is configured to come into contact with the housing 4 in the embodiment above, the cover member may also be configured to come into contact with only the display panel.

6-3

Figure 9:
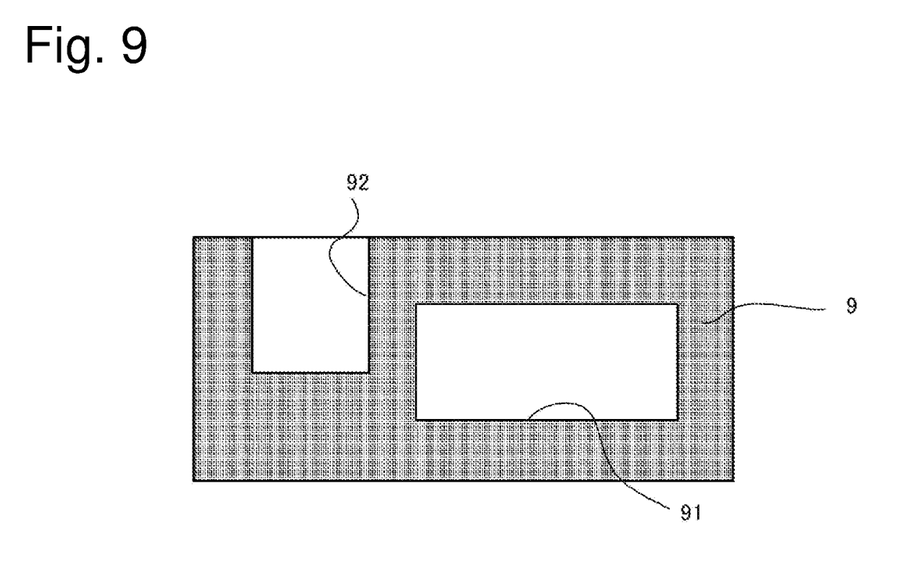
FIG. 9 is a plan view showing an example of a shield layer.

The glass plate 10 can also be provided with, for example, a shield layer 9 as shown in FIG. 9 such that a portion of the display area of the display panel 500 can be seen. This shield layer 9 is provided with at least one opening 91 or cutout 92, and an image displayed on the display panel 500 can be seen through this opening 91 or cutout 92. It is sufficient that this shield layer 9 is formed on at least one of the first surface and the second surface of the glass plate 10. The optical layer can be layered so as to cover the opening 91 and cutout 92. Also, the optical layer can be formed on the shield layer 9. Although there is no particular limitation on the material for forming the shield layer 9, the shield layer 9 can be formed using, for example, a ceramic sheet material with a dark color such as black, brown, gray, or dark blue.

6-4

Although the organic-inorganic composite film 20, 30, 40, 50, or 60 having anti-glare properties is layered, as an optical layer, on the second surface of the glass plate in the embodiment above, the anti-glare properties or anti-reflection properties can also be imparted by, for example, forming minute protrusions and depressions on the second surface of the glass plate 10 through etching or the like. The layer with such protrusions and depressions also corresponds to the optical layer of the present invention. Although the anti-glare films have been described as an example of the optical layer in the embodiment above, another functional film may also be used as the optical layer. Examples thereof include known anti-reflection films, anti-fogging films, and heat reflection films.

6-5

Although the optical layer 20, 30, 40, 50, or 60 is layered on the second surface of the glass plate 10 that has been chemically strengthened in the embodiment above, the glass plate 10 can be chemically strengthened after the optical layer 20, 30, 40, 50, or 60 has been layered on the second surface. Since the optical layer 20, 30, 40, 50, or 60 is not layered on the first surface of the glass plate 10, a film for inhibiting the chemical strengthening is not formed on at least the first surface. Accordingly, the first surface can be chemically strengthened appropriately, thus making it possible to increasing the depth of the compressive stress (dol) in the first surface. On the other hand, the second surface is not chemically strengthened or is chemically strengthened insufficiently due to the optical layer 20, 30, 40, 50, or 60, and thus the depth of the compressive stress (dol) in the second surface is small. As a result, the surface compressive stress of the second surface is larger than that of the first surface, thus making it possible to protect a driver and the like as described above.

6-6

Although a glass plate manufactured using a float process is used in the embodiment above, there is no particular limitation on a method for manufacturing a glass plate. It is sufficient that at least chemical strengthening is performed, and the depth of the compressive stress layer in the second surface, which faces the outside, is smaller than that in the first surface.

6-7

Although the display device of the present invention is applied to a vehicle-mounted display device in the description of the embodiment above, there is no limitation thereto. The display device of the present invention can be applied to display devices in general that are used together with the above-described display panel. The display device can also be used as a touch panel display by providing a touch panel thereon. Accordingly, the above-described cover member can also be applied to various display devices.

LIST OF REFERENCE NUMERALS

10 Glass plate
20, 30, 40, 50, 60 Anti-glare film (optical layer)
500 Display panel

The invention claimed is:
1. A display device, comprising:
a display panel; and
a cover member disposed on the display panel,
wherein the cover member includes:
a glass plate having a first surface and a second surface, at least the first surface being chemically strengthened; and
an optical layer that is layered on the second surface of the glass plate and faces the outside, and
in the glass plate, a depth of a compressive stress layer (dol) in the first surface is larger than that in the second surface,
wherein the optical layer contains at least a matrix and spherical particles,
the particles form protrusions and depressions on a surface of the optical layer on a side opposite to the second surface, and
the optical layer includes a first region that is plateau-shaped in which the particles are piled up in a thickness direction of the layer, and a valley-shaped second region that surrounds the first region or is surrounded by the first region.

2. The display device according to claim 1, wherein the glass plate is manufactured using a float process, and a concentration of tin oxide in the first surface is smaller than that in the second surface.

3. The display device according to claim 1, wherein the optical layer is an organic-inorganic composite film.

4. The display device according to claim 1, wherein the second region includes a portion in which the particles are not piled up or the particles are not present.

5. The display device according to claim 1, wherein the first region has a width of 7.7 μm or more, and the second region has a width of 7 μm or more.

6. The display device according to claim 1, wherein
the particles are substantially composed of plate-shaped particles,
each of the plate-shaped particles has a thickness within a range of 0.3 nm to 3 nm and a main surface average diameter within a range of 10 nm to 1,000 nm, and
the main surfaces of the plate-shaped particles are oriented substantially in parallel with the second surface of the glass plate.

7. The display device according to claim 1, wherein the optical layer includes a region in which the particles are piled up in a thickness direction of the optical layer, and a region in which the particles are not piled up or the particles are not present.

8. The display device according to claim 7, wherein a difference in height measured from the second surface of the glass plate between the highest portion and the lowest portion of the optical layer is three times or more as large as the average particle diameter of the particles.

9. The display device according to claim 7, wherein Smr1 defined in ISO25178 is 10 to 30%.

10. The display device according to claim 7, wherein a surface height BH20 at a load area ratio of 20% defined in ISO25178 is within a range of 0.04 μm to 0.5 μm.

11. The display device according to claim 7, wherein a surface height BH80 at a load area ratio of 80% defined in ISO25178 is within a range of −0.3 μm to 0 μm.

12. The display device according to claim 1, wherein the surface of the optical layer has an Rsm of more than 0 μm and 35 μm or less, the Rsm being an average length of roughness curve elements determined in accordance with JIS B0601: 2001.

13. The display device according to claim 1, wherein the surface of the optical layer has an Ra within a range of 20 nm to 120 nm, the Ra being an arithmetic average roughness of a roughness curve determined in accordance with JIS B0601: 2001.

14. The display device according to claim 1, wherein the second surface of the glass plate has an Ra of 10 nm or less, the Ra being an arithmetic average roughness of a roughness curve determined in accordance with JIS B0601: 2001.

15. The display device according to claim 1, wherein the matrix contains silicon oxide as a main component.

16. The display device according to claim 1, wherein the glass plate has a thickness of 0.5 to 3 mm.

17. A cover member to be included in a display device having a display panel, comprising:
- a glass plate having a first surface and a second surface, at least the first surface being chemically strengthened; and
- an optical layer that is layered on the second surface of the glass plate and faces the outside,
- wherein, in the glass plate, a depth of a compressive stress layer (dol) in the first surface is larger than that in the second surface,
- the optical layer contains at least a matrix and spherical particles,
- the particles form protrusions and depressions on a surface of the optical layer on a side opposite to the second surface, and
- the optical layer includes a first region that is plateau-shaped in which the particles are piled up in a thickness direction of the layer, and a valley-shaped second region that surrounds the first region or is surrounded by the first region.

* * * * *